(12) United States Patent
Song et al.

(10) Patent No.: US 11,946,558 B2
(45) Date of Patent: Apr. 2, 2024

(54) VALVE BODY CONNECTION STRUCTURE AND VALVE ASSEMBLY WITH VALVE BODY CONNECTION STRUCTURE

(71) Applicant: ZHEJIANG DUNAN ARTIFICIAL ENVIRONMENT CO., LTD., Zhejiang (CN)

(72) Inventors: Zhiguo Song, Zhejiang (CN); Haibo Liu, Zhejiang (CN)

(73) Assignee: ZHEJIANG DUNAN ARTIFICIAL ENVIRONMENT CO., LTD., Zhejiang (CN)

(*) Notice: Subject to any disclaimer, the term of this patent is extended or adjusted under 35 U.S.C. 154(b) by 0 days.

(21) Appl. No.: 17/637,465

(22) PCT Filed: May 12, 2020

(86) PCT No.: PCT/CN2020/089881
§ 371 (c)(1),
(2) Date: Feb. 23, 2022

(87) PCT Pub. No.: WO2021/036347
PCT Pub. Date: Mar. 4, 2021

(65) Prior Publication Data
US 2022/0275876 A1    Sep. 1, 2022

(30) Foreign Application Priority Data

Aug. 28, 2019  (CN) .......................... 201921415734.0

(51) Int. Cl.
*F16K 27/10*    (2006.01)
*F16K 31/42*    (2006.01)
(52) U.S. Cl.
CPC .............. *F16K 27/10* (2013.01); *F16K 31/42* (2013.01)

(58) Field of Classification Search
CPC .......... F16K 27/10; F16K 27/00; F16K 31/42; F16K 27/003
See application file for complete search history.

(56) References Cited

U.S. PATENT DOCUMENTS

| 85,377 | A | * | 12/1868 | Fullerton | .............. F16K 27/003 137/343 |
| 2,080,724 | A | * | 5/1937 | Littell | ..................... F16K 27/00 137/356 |

(Continued)

FOREIGN PATENT DOCUMENTS

| CN | 102200199 A | 9/2011 |
| CN | 203009908 U | 6/2013 |

(Continued)

*Primary Examiner* — Umashankar Venkatesan
(74) *Attorney, Agent, or Firm* — Samson G. Yu

(57) ABSTRACT

Disclosed are a valve body connection structure and a valve assembly with the valve body connection structure. The valve body connection structure includes: a first connector including a first connection part and a first plug-in part, wherein the first connection part is fixedly connected to the main valve, and the first plug-in part is disposed on the first connection part; and a second connector including a second connection part, a second plug-in part and an extension part, wherein the second connection part is fixedly connected to the pilot valve, the second plug-in part is disposed on the second connection part, the first plug-in part matches the second plug-in part in an insertion manner, the extension part is disposed on the second connection part, and the extension part is provided with an assembly hole allowing a pipeline of the pilot valve to pass through.

17 Claims, 4 Drawing Sheets

(56) References Cited

U.S. PATENT DOCUMENTS

| | | | | |
|---|---|---|---|---|
| 2,879,781 A | * | 3/1959 | Gimson | F16K 31/42 |
| | | | | 92/37 |
| 3,302,912 A | * | 2/1967 | Hurlburt, Jr. | F16K 27/00 |
| | | | | 248/65 |
| 7,350,537 B2 | * | 4/2008 | Honermann | A01C 23/008 |
| | | | | 248/316.7 |
| 9,285,048 B2 | * | 3/2016 | Faulkenberry | F16K 27/12 |
| 10,197,177 B2 | * | 2/2019 | Kumar | F04C 29/02 |
| 2013/0160865 A1 | * | 6/2013 | Harris | F16K 11/22 |
| | | | | 137/884 |
| 2016/0053901 A1 | * | 2/2016 | Kim | F16K 31/0679 |
| | | | | 137/625.25 |
| 2022/0228799 A1 | * | 7/2022 | Giacomini | F16K 31/0644 |

FOREIGN PATENT DOCUMENTS

| | | | | |
|---|---|---|---|---|
| CN | 104165241 A | * | 11/2014 | F16K 11/00 |
| CN | 205401867 U | | 7/2016 | |
| CN | 206054801 U | | 3/2017 | |
| CN | 107228218 A | * | 10/2017 | F16K 27/00 |
| CN | 210318631 U | | 4/2020 | |
| JP | 2007309487 A | | 11/2007 | |

* cited by examiner

VALVE BODY CONNECTION STRUCTURE AND VALVE ASSEMBLY WITH VALVE BODY CONNECTION STRUCTURE

CROSS-REFERENCE TO RELATED APPLICATION

The disclosure claims the priority of Chinese Patent Application No. 201921415734.0, filed on Aug. 28, 2019 and entitled "Valve body connection structure and valve assembly having same".

TECHNICAL FIELD

The disclosure relates to the field of valves, and in particular to a valve body connection structure and a valve assembly with the valve body connection structure.

BACKGROUND

As a hydraulic valve commonly used in equipment in the refrigeration field, etc., a four-way valve is configured to control a flow direction of fluid in a pipeline of the equipment. The four-way valve is mainly composed of a pilot valve, a main valve and an electromagnetic coil. The pilot valve is fixed to the main valve by a support structure.

In the art known to inventors, a support between the pilot valve and the main valve is of an integrated structure or a split structure fixed through riveting. The integrated structure is difficult to assemble, and the split structure is likely to have problems of riveting deviation and low resonance frequency.

SUMMARY

Some embodiments of the disclosure provide a valve body connection structure and a valve assembly with the valve body connection structure, so as to solve problems that in the art known to inventors, a support is difficult to assemble and is prone to riveting deviation.

An aspect of some embodiments of the disclosure provides a valve body connection structure configured to connect a main valve and a pilot valve. The valve body connection structure includes: a first connector including a first connection part and a first plug-in part, wherein the first connection part is fixedly connected to the main valve, and the first plug-in part is disposed on the first connection part; and a second connector including a second connection part, a second plug-in part and an extension part, wherein the second connection part is fixedly connected to the pilot valve, the second plug-in part is disposed on the second connection part, the first plug-in part matches the second plug-in part in an insertion manner so as to limit movement and rotation of the second connector relative to the first connector, the extension part is disposed on the second connection part, and the extension part is provided with an assembly hole allowing a pilot valve pipeline to pass through.

In some embodiments of the disclosure, the first connection part includes a first bottom wall and two first side walls, the first bottom wall is disposed on the main valve, the two first side walls are disposed opposite each other at two sides of the first bottom wall, the first plug-in part is disposed on at least one of the two first side walls, the second connection part includes a second bottom wall and two second side walls, the second bottom wall is disposed on the pilot valve, the extension part is disposed on the second bottom wall, the two second side walls are disposed opposite each other at two sides of the second bottom wall, and the second plug-in part is disposed on at least one of the two second side walls.

In some embodiments of the disclosure, the first connection part is welded to the main valve, the second connection part is welded to the pilot valve, and the first plug-in part and the second plug-in part match each other in the insertion manner and are further welded and fixed.

In some embodiments of the disclosure, the second plug-in part is a plurality of first protruding parts disposed on the second side wall at intervals, the first plug-in part is a first stepped face disposed on the first side wall, and the first side wall is capable of extending into first gaps formed by the plurality of first protruding parts correspondingly, so as to enable the first protruding part to abut against the first stepped face.

In some embodiments of the disclosure, the second plug-in part is a plurality of first protruding parts disposed on the second side wall at intervals, the first plug-in part is a plurality of slots disposed on the first side wall, and the plurality of first protruding parts are capable of extending into the plurality of slots correspondingly one-to-one.

In some embodiments of the disclosure, the first plug-in part is a plurality of second protruding parts disposed on the first side wall at intervals, the second plug-in part is a second stepped face disposed on the second side wall, and the second side wall is capable of extending into second gaps formed by the plurality of second protruding parts correspondingly, so as to enable the second protruding part to abut against the second stepped face.

In some embodiments of the disclosure, the first bottom wall is bent and fitted to an outer wall of the main valve, and/or the second bottom wall is bent and fitted to a pilot valve outer wall.

In some embodiments of the disclosure, the first bottom wall and/or the second bottom wall is provided with a welding hole.

Another aspect of the disclosure provides a valve assembly, which includes a main valve, a pilot valve and a valve body connection structure. The pilot valve is disposed on the main valve by the valve body connection structure, and the valve body connection structure is the above-mentioned valve body connection structure.

In some embodiments of the disclosure, the pilot valve includes a guide tube and a capillary tube, an extension part of the valve body connection structure is fitted to the guide tube, and the capillary tube passes through an assembly hole of the extension part and is welded to the extension part.

Through use of the technical solution of some embodiments of the disclosure, the valve body connection structure is disposed in a split manner, so that the first connector is capable of being fixed to the main valve and the second connector is capable of being fixed to the pilot valve, and then the first connector and the second connector are combined and fixed so as to achieve overall assembly and fixation of the valve assembly, thereby reducing operation difficulty of connection and fixation of each part, and facilitating the overall assembly. In addition, the first connector and the second connector match each other in the insertion manner for pre-positioning, thus limiting relative movement of the first connector and the second connector after insertion.

BRIEF DESCRIPTION OF THE DRAWINGS

The accompanying drawings of the description forming a part of the disclosure serve to provide a further understand- In the drawings.

The above accompanying drawings include the following reference signs:

10: first connector; 11: first bottom wall; 12: first side wall; 14: first welding hole; 15: first insertion part; 16: first stepped face; 17: slot; 18: second protruding part; 19: gap; 20: second connector; 21: second bottom wall; 22: second side wall; 23: extension part; 24: second welding hole; 25: assembly hole; 26: first protruding part; 28: second stepped face; 29: second insertion part; 80: main valve; 90: pilot valve; 91: pilot valve outer wall; and 92: capillary tube.

DETAILED DESCRIPTION OF THE EMBODIMENTS

It should be noted that embodiments in the application and features in the embodiments may be combined with one another if there is no conflict. The disclosure will be described in detail below with reference to the accompanying drawings in conjunction with the embodiments.

Embodiment 1

Figure 1:
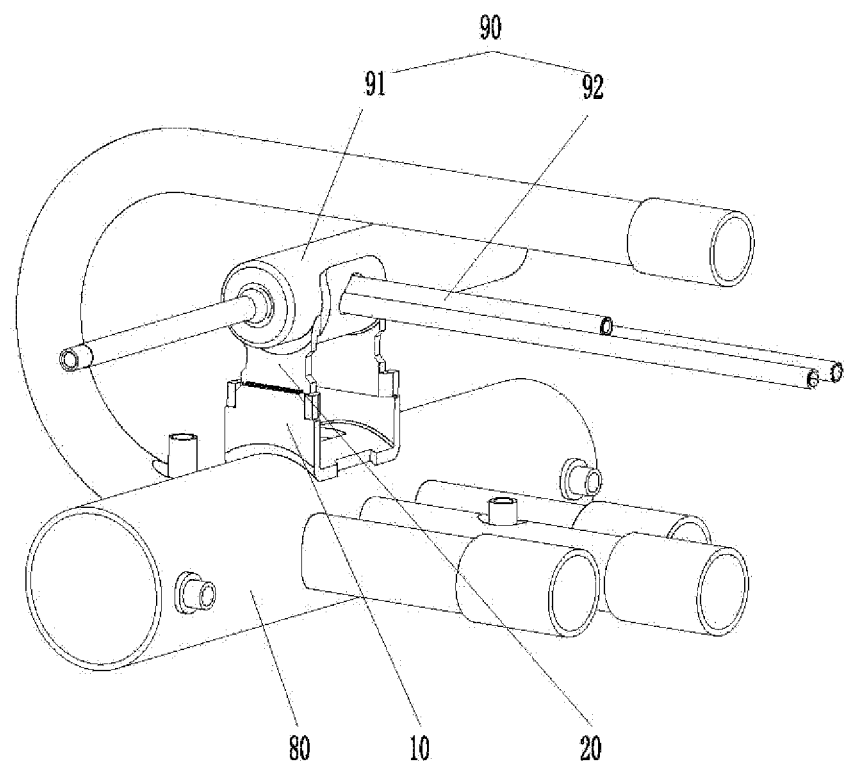
FIG. 1 shows a structural schematic diagram of Embodiment 1 of a valve body connection structure according to the disclosure.

A valve body connection structure of the disclosure is configured to connect a main valve and a pilot valve. As shown in FIG. 1, the valve body connection structure of Embodiment 1 includes a first connector 10 and a second connector 20 which are arranged separately. The first connector 10 includes a first connection part and a first plug-in part, wherein the first connection part is fixedly connected to the main valve 80, and the first plug-in part is disposed on the first connection part. The second connector 20 includes a second connection part, a second plug-in part and an extension part 23, wherein the second connection part is fixedly connected to the pilot valve 90, and the second plug-in part is disposed on the second connection part. The first plug-in part matches the second plug-in part in an insertion manner so as to limit movement and rotation of the second connector 20 relative to the first connector 10, the extension part 23 is disposed on the second connection part, and the extension part 23 is provided with an assembly hole 25 allowing a pilot valve pipeline to pass through.

Through use of the technical solution of the embodiment, the valve body connection structure is disposed in a split manner, so that the first connector 10 is capable of being fixed to the main valve and the second connector 20 is capable of being fixed to the pilot valve 90, and then the first connector 10 and the second connector 20 are combined and fixed, so as to achieve overall assembly and fixation of a valve assembly, thereby reducing operation difficulty of connection and fixation of each part, and facilitating the overall assembly. In addition, the first connector 10 and the second connector 20 match each other in the insertion manner for pre-positioning, thus limiting relative movement of the first connector 10 and the second connector 20 after insertion.

In the embodiment, the first connection part is welded to the main valve 80, the second connection part is welded to the pilot valve 90, and the first plug-in part and the second plug-in part match each other in the insertion manner and are further welded and fixed. Under a pre-positioning effect of the above structure, welding and fixing are conducted, so that a welding effect is desirable, weld lines are not prone to breaking, and an assembled valve assembly is firm in overall structure, stable to use and long in service life.

Figure 2:
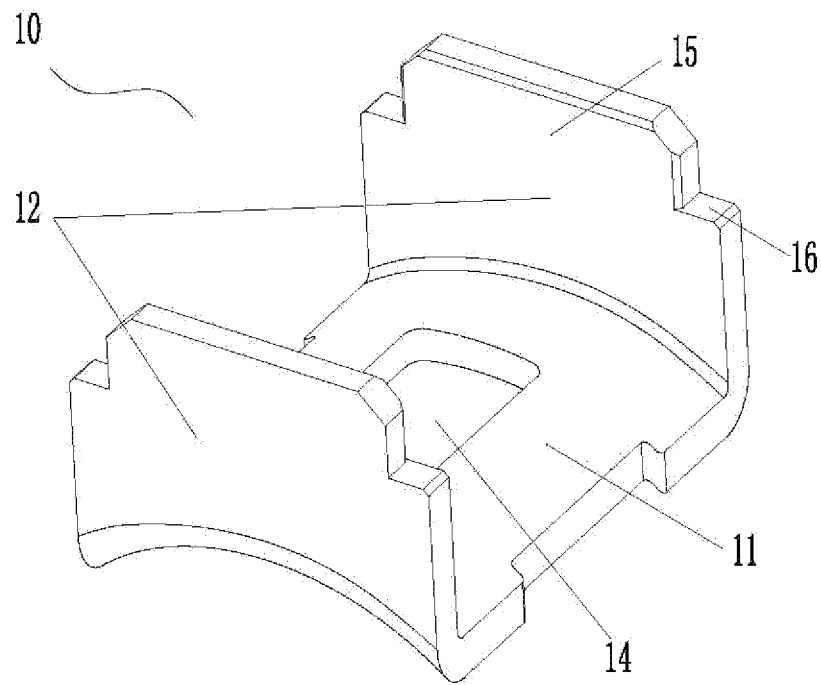
FIG. 2 shows a structural schematic diagram of a first connector of the valve body connection structure in FIG. 1.
Figure 3:
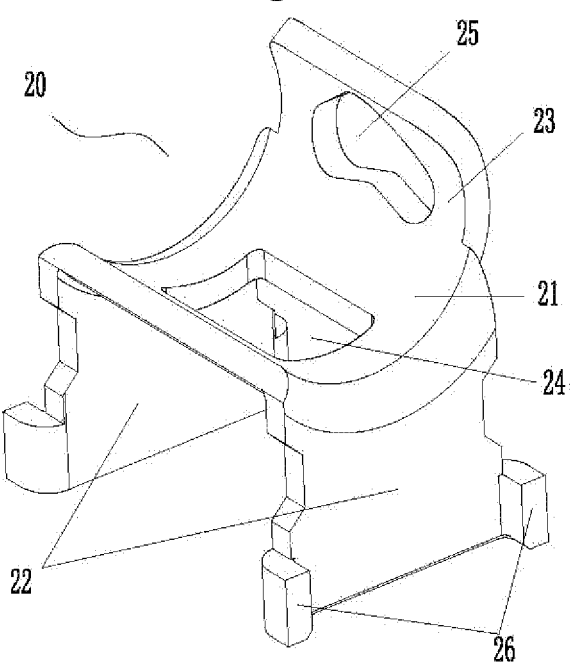
FIG. 3 shows a structural schematic diagram of a second connector of the valve body connection structure in FIG. 1.

As shown in FIG. 2, the first connection part of the embodiment includes a first bottom wall 11 and two first side walls 12, the first bottom wall 11 is disposed on the main valve 80, the two first side walls 12 are disposed opposite each other at two sides of the first bottom wall 11, and two sides of the first side wall 12 are provided with two first stepped faces 16 and form a first insertion part 15. As shown in FIG. 3, the second connection part of the embodiment includes a second bottom wall 21 and two second side walls 22, the second bottom wall 21 is disposed on a pilot valve outer wall 91, the extension part 23 is disposed on the second bottom wall 21, the two second side walls 22 are disposed opposite each other at two sides of the second bottom wall 21, and the second side wall 22 is provided with two first protruding parts 26 at intervals which protrude outwards and forms the second plug-in part. During assembly, the first insertion part 15 extends into a gap formed by the two first protruding parts 26, and the two first protruding parts 26 abut against the two first stepped faces 16 respectively for positioning, so that the second connector 20 is only capable of moving relative to the first connector 10 in an insertion direction, but cannot move in a front-back direction and a left-right direction or rotate relative to any axis, thereby achieving pre-positioning between the first connector 10 and the second connector 20.

For convenience of welding and fixing, as shown in FIGS. 2 and 3, in the embodiment, the first bottom wall 11 is provided with a first welding hole 14, and the second bottom wall 21 is provided with a second welding hole 24.

As shown in FIGS. 1-3, in the embodiment, the first bottom wall 11 is bent and fitted to an outer wall of the main valve 80, and the second bottom wall 21 and the extension part 23 are also bent and fitted to the pilot valve outer wall 91. The assembly hole 25 is disposed on the extension part 23, and an outline of the assembly hole matches an outline of a capillary tube 92 of the pilot valve 90. On the one hand, the assembly hole keeps away from the second bottom wall 21 so as to facilitate assembly of the capillary tube 92 of the pilot valve 90; and on the other hand, a wall thickness of a nearby part of the capillary tube 92 is increased so as to facilitate welding and fixing of the capillary tube 92 and the extension part 23.

Embodiment 2

Figure 4:
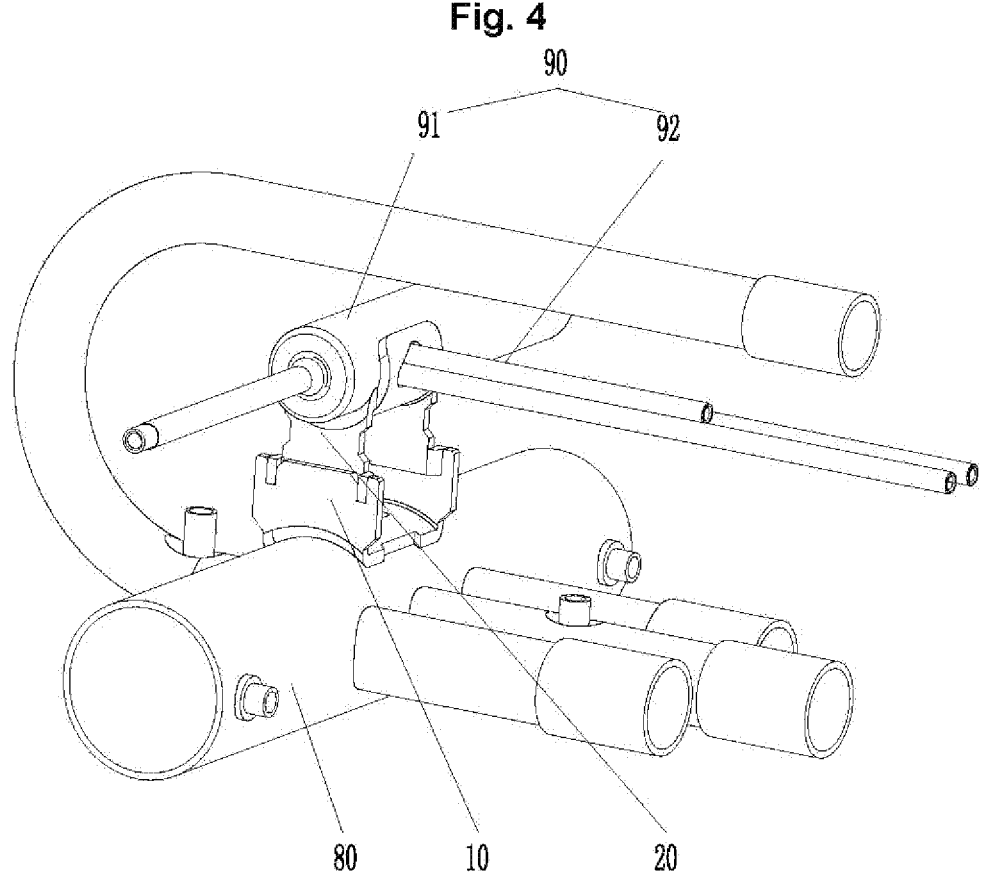
FIG. 4 shows a structural schematic diagram of Embodiment 2 of the valve body connection structure according to the disclosure.
Figure 5:
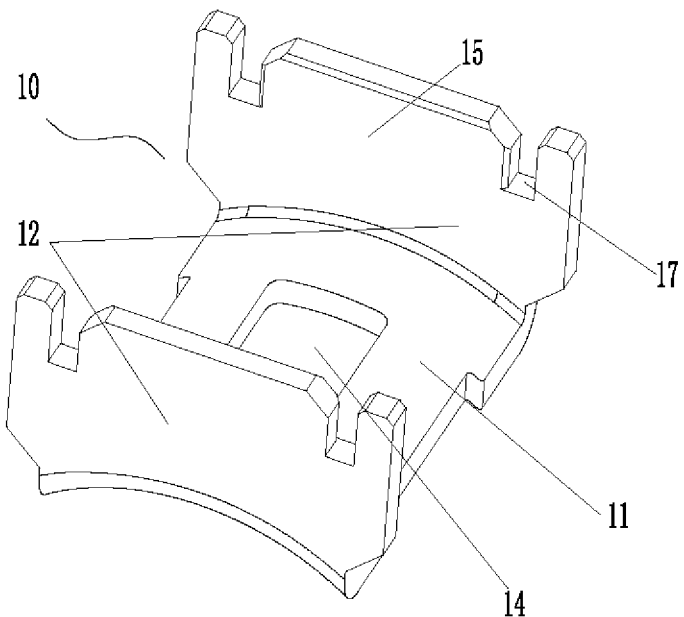
FIG. 5 shows a structural schematic diagram of a first connector of the valve body connection structure in FIG. 4.

A structure of a second connector 20 in a valve body connection structure of Embodiment 2 is consistent with that of the Embodiment 1, and only a structure of a first connector 10 is slightly adjusted. As shown in FIGS. 4 and 5, a second side wall 22 is provided with two first protruding parts 26 at intervals which protrude outwards and forms a second plug-in part, a first plug-in part is two slots 17 disposed on a first side wall 12, the first protruding parts 26 are capable of extending into the two slots 17 in a one-to-one corresponding manner, and meanwhile, a first insertion part 15 is capable of extending into a gap formed by the two first protruding parts 26. A pre-positioning effect of the embodiment is substantially consistent with that of the Embodiment 1.

Embodiment 3

Figure 6:
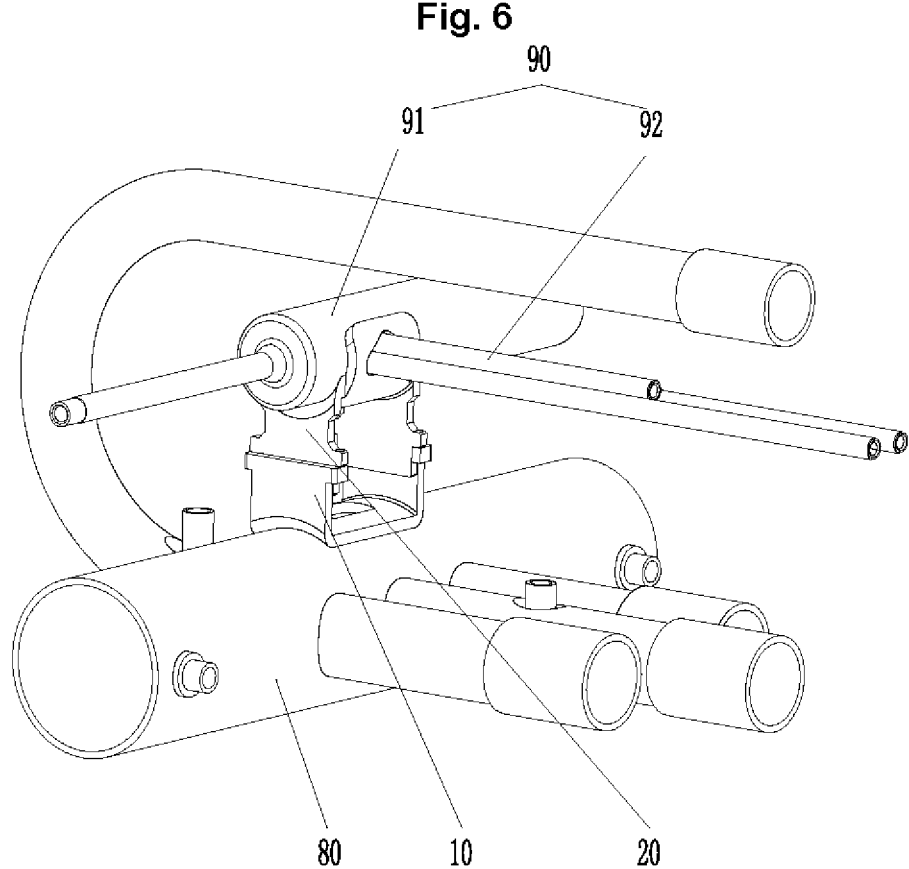
FIG. 6 shows a structural schematic diagram of Embodiment 3 of the valve body connection structure according to the disclosure.
Figure 7:
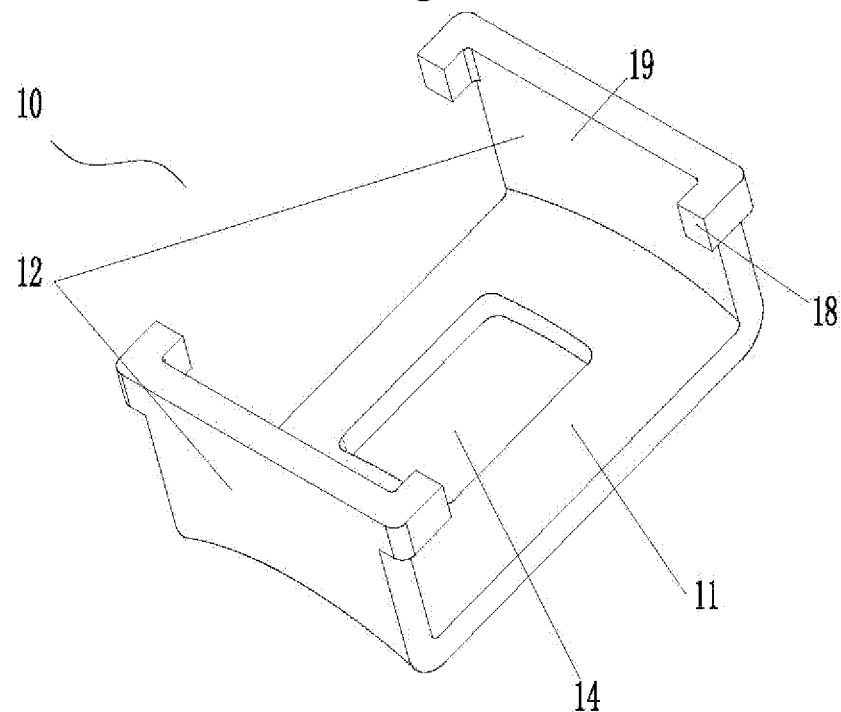
FIG. 7 shows a structural schematic diagram of a first connector of the valve body connection structure in FIG. 6.
Figure 8:
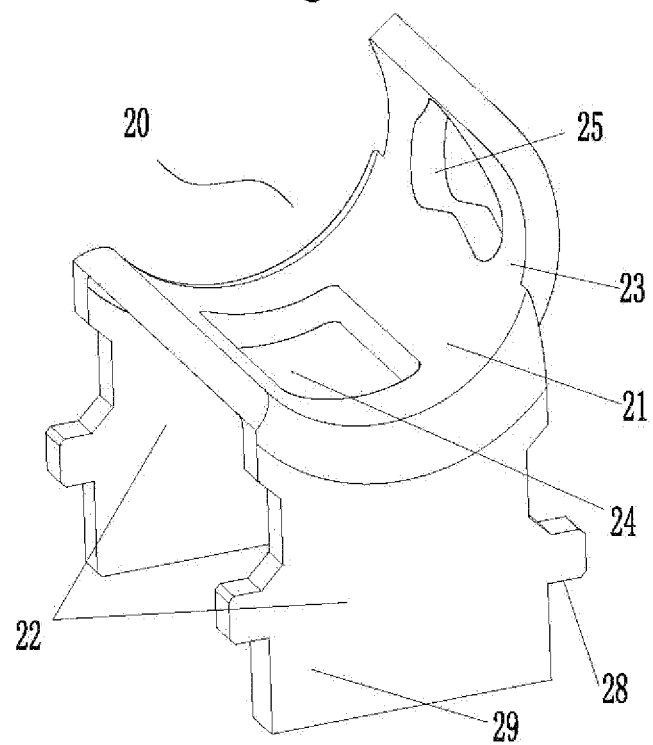
FIG. 8 shows a structural schematic diagram of a second connector of the valve body connection structure in FIG. 6.

Structures of a first connector 10 and a second connector 20 in a valve body connection structure of Embodiment 3 are adjusted. As shown in FIGS. 6-8, in the embodiment, a first plug-in part is two second protruding parts 18 which are disposed on a first side wall 12 at intervals and protrude inwards, and the two second protruding parts 18 are disposed at intervals to form a gap 19. Two sides of a second side wall 22 are provided with two second stepped faces 28 and forms a second insertion part 29, the second insertion part 29 serves as a second plug-in part and is capable of extending into the gap 19 correspondingly, and then the second protruding part 18 abuts against the second stepped face 28. A pre-positioning effect of the embodiment is substantially consistent with those of the Embodiment 1 and the Embodiment 2.

The disclosure further provides a valve assembly, which may refer to FIGS. 1-8. The valve assembly of the disclosure includes a main valve 80, a pilot valve 90 and a valve body connection structure. The pilot valve 90 is disposed on the main valve 80 by the valve body connection structure, and the valve body connection structure is a valve body connection structure includes all or part of technical structures of the embodiments.

From the above description, it may be seen that the above-mentioned embodiments of the disclosure achieve the technical effects as follows:

The valve body connection structure is disposed in a split manner, so that the first connector 10 is capable of being fixed to the main valve 80 and the second connector 20 is capable of being fixed to the pilot valve 90, and then the first connector 10 and the second connector 20 are combined and fixed so as to achieve overall assembly and fixation of the valve assembly, thereby reducing operation difficulty of connection and fixation of each part, and facilitating the overall assembly. In addition, the first connector 10 and the second connector 20 match each other in an insertion manner for pre-positioning, thus limiting relative movement of the first connector 10 and the second connector 20 after insertion.

The foregoing is merely illustrative of some embodiments of the disclosure and is not intended to be limiting of the disclosure, and various changes and modifications may be made by those skilled in the art. Any modification, equivalent substitution, improvement, and the like within the spirit and principles of the disclosure are intended fall within the scope of the disclosure.

What is claimed is:

1. A valve body connection structure, being configured to connect a main valve and a pilot valve, wherein the valve body connection structure comprises:
   a first connector comprising a first connection part and a first plug-in part, wherein the first connection part is fixedly connected to the main valve, and the first plug-in part is disposed on the first connection part; and
   a second connector comprising a second connection part, a second plug-in part and an extension part, wherein the second connection part is fixedly connected to the pilot valve, the second plug-in part is disposed on the second connection part, the first plug-in part is cooperated with the second plug-in part in an insertion manner, so as to limit movement and rotation of the second connector relative to the first connector, the extension part is disposed on the second connection part, and the extension part is provided with an assembly hole allowing a pilot valve pipeline to pass through;
   wherein a step surface is formed on the first plug-in part and/or the second plug-in part, and the step surface is used for limiting a relative movement of the first plug-in part and the second plug-in part along a plug-in direction.

2. The valve body connection structure as claimed in claim 1, wherein the first connection part comprises a first bottom wall and two first side walls, wherein the first bottom wall is disposed on the main valve, the two first side walls are disposed opposite each other at two sides of the first bottom wall, the first plug-in part is disposed on at least one of the two first side walls, the second connection part comprises a second bottom wall and two second side walls, the second bottom wall is disposed on the pilot valve, the extension part is disposed on the second bottom wall, the two second side walls are disposed opposite each other at two sides of the second bottom wall, and at least one of the two second side walls is provided with the second plug-in part.

3. The valve body connection structure as claimed in claim 2, wherein the second plug-in part comprises a plurality of first protruding parts disposed on the second side wall at intervals, the first plug-in part comprises a first stepped face disposed on the first side wall, and the first side wall is capable of extending into first gaps formed by the plurality of first protruding parts correspondingly, so as to enable the first protruding part to abut against the first stepped face.

4. The valve body connection structure as claimed in claim 2, wherein the second plug-in part comprises a plurality of first protruding parts disposed on the second side wall at intervals, the first plug-in part comprises a plurality of slots disposed on the first side wall, and the plurality of first protruding parts are capable of extending into the plurality of slots correspondingly one-to-one.

5. The valve body connection structure as claimed in claim 2, wherein the first plug-in part comprises a plurality of second protruding parts disposed on the first side wall at intervals, the second plug-in part comprises a second stepped face disposed on the second side wall, and the second side wall is capable of extending into second gaps formed by the plurality of second protruding parts correspondingly, so as to enable the second protruding part to abut against the second stepped face.

6. The valve body connection structure as claimed in claim 2, wherein the first bottom wall is bent and fitted to an outer wall of the main valve, and/or the second bottom wall is bent and fitted to a pilot valve outer wall.

7. The valve body connection structure as claimed in claim 6, wherein the first bottom wall and/or the second bottom wall is provided with a welding hole.

8. The valve body connection structure as claimed in claim 1, wherein the first connection part is welded to the main valve, the second connection part is welded to the pilot valve, and the first plug-in part and the second plug-in part match each other in the insertion manner and are further welded and fixed.

9. A valve assembly, comprising a main valve, a pilot valve and the valve body connection structure as claimed in claim 1, wherein the pilot valve is disposed on the main valve by the valve body connection structure.

10. The valve assembly as claimed in claim 9, wherein the pilot valve comprises a guide tube and a capillary tube, an extension part of the valve body connection structure is fitted to the guide tube, and the capillary tube passes through an assembly hole of the extension part and is welded to the extension part.

11. The valve assembly as claimed in claim 9, wherein the first connection part comprises a first bottom wall and two first side walls, wherein the first bottom wall is disposed on the main valve, the two first side walls are disposed opposite each other at two sides of the first bottom wall, the first plug-in part is disposed on at least one of the two first side walls, the second connection part comprises a second bottom wall and two second side walls, the second bottom wall is disposed on the pilot valve, the extension part is disposed on the second bottom wall, the two second side walls are disposed opposite each other at two sides of the second bottom wall, and at least one of the two second side walls is provided with the second plug-in part.

12. The valve assembly as claimed in claim 11, wherein the second plug-in part comprises a plurality of first protruding parts disposed on the second side wall at intervals, the first plug-in part comprises a first stepped face disposed on the first side wall, and the first side wall is capable of extending into first gaps formed by the plurality of first protruding parts correspondingly, so as to enable the first protruding part to abut against the first stepped face.

13. The valve assembly as claimed in claim 11, wherein the second plug-in part comprises a plurality of first protruding parts disposed on the second side wall at intervals, the first plug-in part comprises a plurality of slots disposed on the first side wall, and the plurality of first protruding parts are capable of extending into the plurality of slots correspondingly one-to-one.

14. The valve assembly as claimed in claim 11, wherein the first plug-in part comprises a plurality of second protruding parts disposed on the first side wall at intervals, the second plug-in part comprises a second stepped face disposed on the second side wall, and the second side wall is capable of extending into second gaps formed by the plurality of second protruding parts correspondingly, so as to enable the second protruding part to abut against the second stepped face.

15. The valve assembly as claimed in claim 11, wherein the first bottom wall is bent and fitted to an outer wall of the main valve, and/or the second bottom wall is bent and fitted to a pilot valve outer wall.

16. The valve assembly as claimed in claim 15, wherein the first bottom wall and/or the second bottom wall is provided with a welding hole.

17. The valve assembly as claimed in claim 9, wherein the first connection part is welded to the main valve, the second connection part is welded to the pilot valve, and the first plug-in part and the second plug-in part match each other in the insertion manner and are further welded and fixed.

* * * * *